United States Patent
Zhu

(10) Patent No.: US 10,782,595 B2
(45) Date of Patent: Sep. 22, 2020

(54) HANDLE WITH ARM SUPPORT USED FOR PHOTOGRAPHY EQUIPMENT

(71) Applicant: ZHONGSHAN DASHAN PHOTOGRAPHIC EQUIPMENT CO., LTD., Zhongshan, Guangdong (CN)

(72) Inventor: Xihua Zhu, Guangdong (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 22 days.

(21) Appl. No.: 16/036,880

(22) Filed: Jul. 16, 2018

(65) Prior Publication Data

US 2019/0265580 A1 Aug. 29, 2019

Related U.S. Application Data

(63) Continuation of application No. PCT/CN2018/082416, filed on Apr. 10, 2018.

(30) Foreign Application Priority Data

Feb. 28, 2018 (CN) .................... 2018 2 0285377 U
Apr. 4, 2018 (CN) .......................... 2018 1 0302217

(51) Int. Cl.
 *G03B 17/56* (2006.01)
 *F16M 11/12* (2006.01)

(52) U.S. Cl.
 CPC ......... *G03B 17/561* (2013.01); *F16M 11/121* (2013.01); *G03B 17/563* (2013.01); *F16M 2200/04* (2013.01); *F16M 2200/06* (2013.01)

(58) Field of Classification Search
 None
 See application file for complete search history.

(56) References Cited

U.S. PATENT DOCUMENTS 3,966,101 A * 6/1976 Taylor .................... F16M 13/04
 224/219
4,514,067 A * 4/1985 Gallegos ................ F16M 13/04
 224/908

(Continued)

OTHER PUBLICATIONS

MrCheesyCam. "XCam Mini Video Stabilizer vs Skyler MiniCam Stabilizer." YouTube, May 15, 2013, www.youtube.com/watch?v=X6uGsww6L-U. (Year: 2013).*

(Continued)

*Primary Examiner* — Clayton E. LaBalle
*Assistant Examiner* — Dennis Hancock

(57) ABSTRACT

A handle with arm support used for a photography equipment, comprises a handle grip and a connecting portion for connecting with the photography equipment, wherein the handle further comprises an arm support connected with the handle grip adapted for supporting a user's arm whilst in use, and the arm support is a structural component which maintains a definite shape under compression and is capable of withstanding a load. The arm support supporting the lower portion of a user's arm, as such, the force needed from a wrist is reduced significantly, especially on the wrist so that the user will not feel tired or encounter wrist fatigue, and a handle operation is more flexible.

17 Claims, 4 Drawing Sheets

(56) References Cited

U.S. PATENT DOCUMENTS

| | | | | | |
|---|---|---|---|---|---|
| 5,323,195 | A | * | 6/1994 | Phillips | F16M 13/04 348/E5.025 |
| 7,691,075 | B1 | * | 4/2010 | Reece | G03B 17/561 602/20 |
| 2007/0053680 | A1 | * | 3/2007 | Fromm | F16M 11/14 396/420 |
| 2010/0104274 | A1 | * | 4/2010 | Rowen | G03B 17/00 396/425 |
| 2011/0211164 | A1 | * | 9/2011 | Monroe | F16M 11/14 352/243 |
| 2014/0052039 | A1 | * | 2/2014 | Summit | A61F 5/013 602/21 |
| 2018/0152637 | A1 | * | 5/2018 | Tolman | H04N 13/243 |

OTHER PUBLICATIONS

"Flyfilms Flyboy Steadycam Camera Stabilizer + Arm Brace FREE Quick Release BAG (Flyboy-III with Mini Arm Brace)." SnapDeal, 2014, www.snapdeal.com/product/flyfilms-flyboy-steadycam-camera-stabilizer/982254448. (Year: 2014).*

* cited by examiner

HANDLE WITH ARM SUPPORT USED FOR PHOTOGRAPHY EQUIPMENT

CROSS-REFERENCE TO RELATED APPLICATIONS

This application is a Continuation Application of PCT Application No. PCT/CN2018/082416 filed on Apr. 10, 2018, which claims priority of Chinese Utility Model Application No. 201820285377.X filed on Feb. 28, 2018 and Chinese Patent Application No. 201810302217.6 filed on Apr. 4, 2018. The entire contents of the above applications are hereby incorporated by reference.

TECHNICAL FIELD

The present invention relates to the field of photography, video recording, and more particularly to a handle with arm support used for photography equipment.

BACKGROUND

With developments in technology and changes in the way we live, image capturing devices and cameras have become more and more popular. Currently, when a user is video shooting with a photography device or camera, he/she generally moves whilst holding the photography device or camera with their hands. Subsequently, the photography device or camera is prone to serious shaking or jittering during video shooting, resulting in poor image quality. In view of this and to compensate for this, camera balancing and stabilizing systems, generally known as camera stabilizers, have been developed.

Current camera stabilizers are prone to be heavy and once a photography device and especially a heavy camera is mounted on them, the stabilizer becomes heavier still, imposing a greater stress on the user's wrist and arm resulting in fatigue during use.

An objective of the present invention is to provide a handle with arm support to overcome the problems posed by other systems.

SUMMARY

The purpose of the present invention to overcome the disadvantages of conventional camera stabilizers by providing a more reasonable structure and allowing more effortless and comfortable usage A handle with arm support used for photography equipment comprises a handle grip and a connecting portion for connecting with the photography equipment, wherein the handle further comprises an arm support connected with the handle grip adapted for supporting a user's arm in use, and the arm support is a structural component which maintains a definite shape under compression and is capable of withstanding a load.

Preferably, the arm support is curved and forms an accommodation space for accommodating the user's arm.

Preferably, the arm support at least partially extends obliquely in a direction away from the handle grip.

Preferably, the arm support further comprises a horizontal arm section and a vertical arm section, and a front end of the horizontal arm section is connected with the handle grip, the vertical arm section obliquely extends from a bottom end of the horizontal arm section in a direction away from the handle grip, and the support section longitudinally extends from a tail end of the vertical arm section in a direction of substantially lateral to the handle grip.

Preferably, the arm support is made of carbon fiber, metal or plastic.

Preferably, the arm support is non-detachably and integrally connected to the handle grip.

Preferably, the arm support is detachably connected to the handle grip by a locking structure.

Preferably, the handle grip further comprises a base, a slot is provided on the base for transverse insertion of the arm support; the locking structure comprises a pin, a screw, and a spring, the pin and the spring are disposed in a mounting groove provided at the base adjacent to the slot, a screw chute is provided at a bottom wall of the slot of the base and the mounting groove and the slot are communicated with each other by the screw chute, such that the screw is capable of inserting in the screw chute from the slot and then into the mounting groove to engage with the pin, a locking slot is provided at the front end of the horizontal arm section for the installed screw sliding in or out.

A photography equipment assembly, comprises a photography equipment and a handle with arm support according to claim 1, wherein the handle with arm support is connected to the photography equipment directly or indirectly.

Preferably, an upper end of the handle grip is connected with the connecting portion by a joint.

The present invention has the following beneficial effects compared with the previous equipment. The arm support essentially supports the lower portion of the arm so that the weight of the stabilizer with the camera mounted thereon is mainly supported by leverage generated from downward movement caused by the arm pressed on the arm support. As such, the force needed from the wrist is reduced significantly due to the leverage function, causing less fatigue to the user, especially on the wrist so that the user will not feel tired or experience wrist fatigue, and a handle operation is more flexible. Therefore, the present invention has a more reasonable structure and thus allows more effort-saving, comfortable and prolonged use of photography devices and improves stability of the photography device during shooting and thus improves the quality of the recorded material.

BRIEF DESCRIPTION OF THE DRAWINGS

The further features of the present invention will be apparent below with reference to the description of the preferred embodiments which are only provided by means of illustrations, it is shown.

DESCRIPTION OF THE EMBODIMENTS

The present invention will be further described in detail with reference to the accompanying drawings and embodiments so that the objects and advantages of the present invention will be more apparent.

Figure 1:
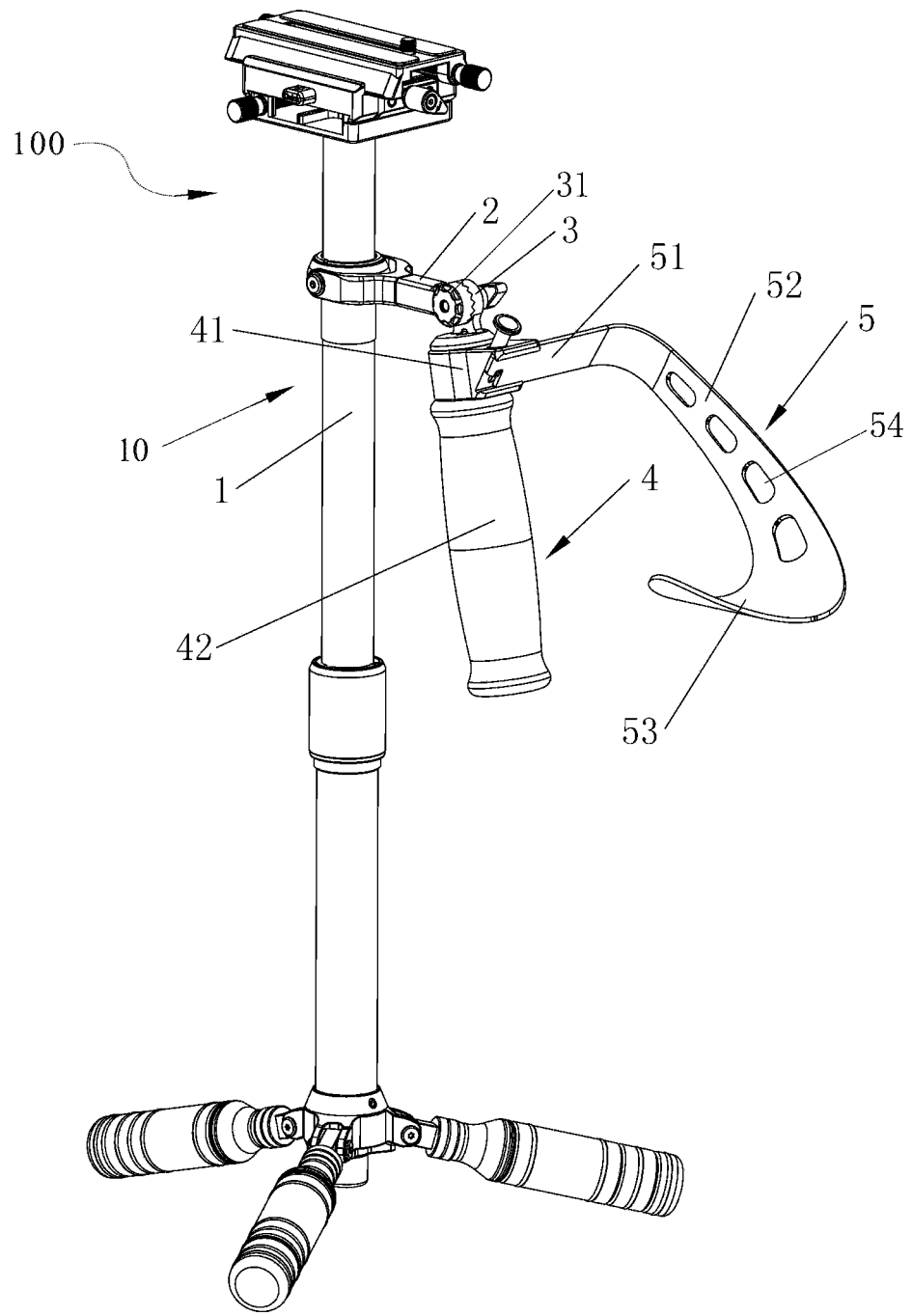
FIG. 1 is a perspective schematic view of a photography equipment assembly according to an embodiment of the present invention.
Figure 2:
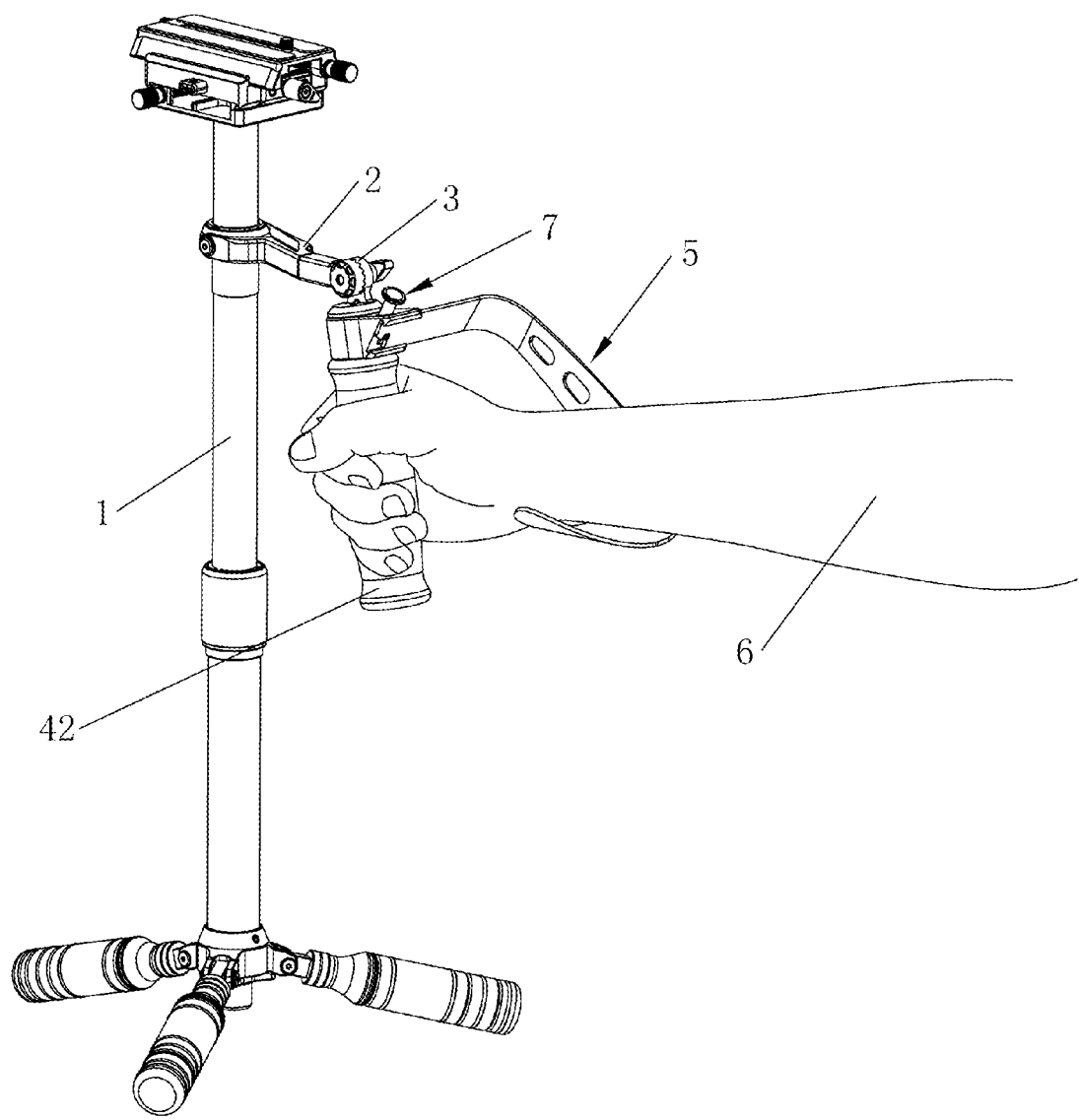
FIG. 2 illustrates the photography equipment assembly of FIG. 1 in use.

As shown in FIG. 1 and FIG. 2, a photography equipment component 100 according to an embodiment of the present invention comprises a photography equipment 10 and a handle 4 having an arm support. The photography equipment 10 has a post 1, wherein the post 1 and a photography platform may connect with a weight tripod, which connection may be the same with that of traditional photography stabilizers so it will not be discussed in detail here. The handle 4 is connected to the post 1.

The handle 4 comprises a handle grip 42 and an arm support 5 connecting with the handle grip 42. Preferably, the handle 4 further comprises a connecting portion 2 for connecting with the post 1 of the photography equipment 10. An end of the connecting portion 2 is provided with a pipe clamp (such as Y-type clamp, U-type clamp or O-type clamp) which can be firmly connected to the post 1, and another end of the connecting portion 2 is provided with a handle connector 3 which can be reliably connected with the handle grip 42. The handle connector 3 includes an angle adjusting element 31 for the handle. The orientation of the handle 4 can be adjusted by manipulating the angle adjusting element for different requirements of users, and thus satisfies various users' operation habits with different heights and angles for shooting.

In the present invention, the handle 4 is detachably connected to the post 1 of the photography equipment 10 by, for example, the connecting portion 2, and thus it can be easily mounted on any known photography equipment, which can be a traditional hand-held stabilizer or an electronic stabilizer. As used for the electronic stabilizer, the handle 4 can be used as a grip for the electronic stabilizer. It can be understood that, as an alternative, the handle can also be non-detachably connected with the post 1. Preferably, the handle grip 42 is preferably provided with a handle sleeve. The handle sleeve can be foam or rubber detachably arranged on and covering the handle grip 42. The handle sleeve is wear-resisting, environment friendly without abnormal odor, comfortable feeling and easy to replace.

An upper end of the handle grip 42 has an articulated joint connected with the handle connector 3. The arm support 5 is connected to the upper end of the handle grip 42, adjacent to and below the articulated joint.

The arm support 5 is curved and forms an accommodation space for accommodating an arm 6 of a user. A bottom end of the arm support 5 far away from the handle grip 42 forms a support section 53 for supporting the arm of the user in use. The accommodation space is large enough to be adapted to arms of different sizes and in the meanwhile meets not only left-handed requirements but also right-handed requirements. Preferably, the support section 53 is curved and fitted with a lower contour of user's arm 6. The curved support section 53 not only fits the arm 6 well but also prevents the arm 6 from slipping out the arm support 5 whilst in use.

In this embodiment, the specific structure of the arm support 5 includes, in sequence: a horizontal arm section 51 extending substantially horizontally from a joint between the arm support 5 and the handle grip 42, a vertical arm section 52 extending vertically and obliquely from the distal end of the horizontal arm section 51 in a direction away from the handle grip 42, and the support section 53, as described above, extending transversely from the distal end of the vertical arm section 52. The arm support 5 formed in such way forms a receiving space through which a user\s hand can reach and hold the handle grip 42. When the hand holds the handle grip 42, the support section 53 supports the lower portion of the arm 6. It is conceivable that the arm support 5 can be U-shaped or C-shaped formed by extending obliquely.

In use, when the user's hand holds the handle grip 42, the support section 53 of the arm support 5 supports the lower portion of the arm 6 so that the handle grip 42, the arm support 5 and the user's arm 6 forms a stable triangular-support structure. Force of gravity ensures that the stabilizer with the camera mounted thereon has a tendency to move downwardly with respect to a fulcrum at the hand grip 42 above which portion the user's hand holds, and meanwhile, the arm support 5 has a tendency to move upwardly with respect to the fulcrum, which collectively functions like a leverage. Therefore, a downward force applied by user's arm 6 on the arm support 5 will prevent the stabilizer with the camera move downwardly. As a result, the weight of the stabilizer with the camera is mainly supported by the user's arm 6 due to the leverage function, and only a small fraction of the weight is supported by the swinging force from the wrist. As such, the force needed from the wrist is reduced significantly due to the leverage function, causing less fatigue to the user, especially on the wrist so that the user will not feel tired, suffer wrist fatigue and handle operation is more flexible. Therefore, the present invention has a more reasonable structure and thus allows more effort-saving and comfortable use in holding photography devices and improves stability of those devices during shooting and thus improves the quality of the video recording.

Preferably, in this embodiment, the arm support 5 is provided with a plurality of through holes 54, which on the one hand can be used for venting, and on the other hand can reduce the weight of the arm support as well as reduce the material cost of the arm support. The through holes 54 can be designed in circle shape, ellipse shape or the like. It can be understood that the holes 54 can be designed as blind holes which can also reduce the weight of the arm support 5 and save costs in further embodiments. In addition, the arm support 5 can preferably be made of elastic materials, such as carbon fiber, metal (for example steel), plastic and so on.

Figure 3:
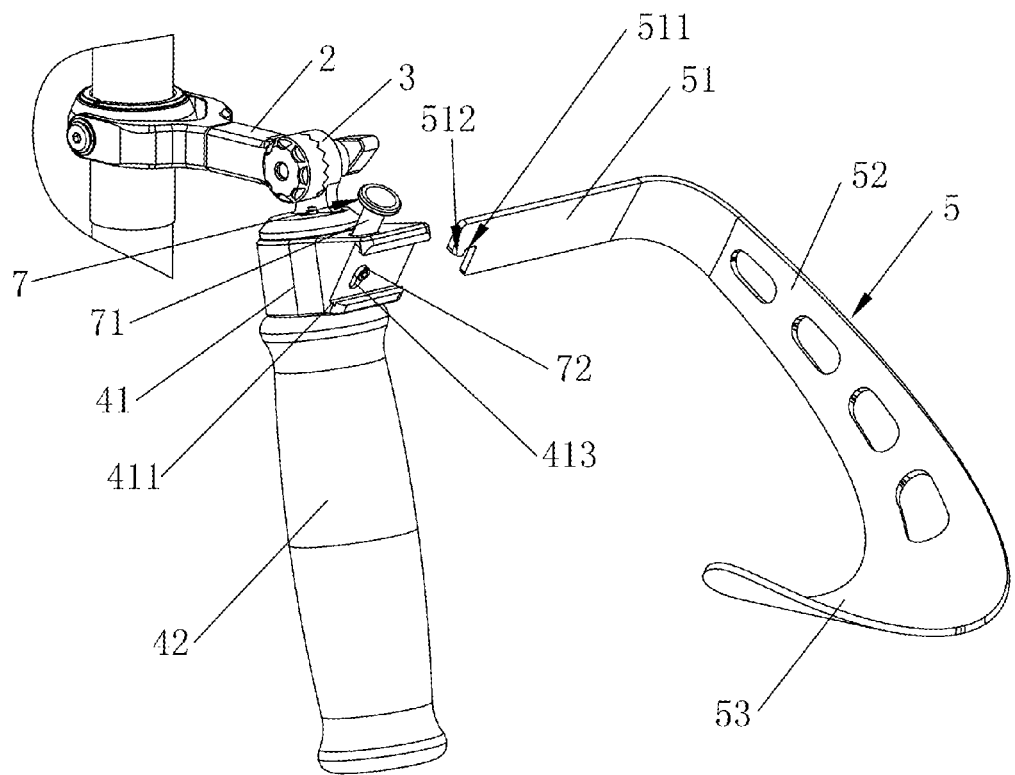
FIG. 3 is a partially exploded view of a handle of the photography equipment of FIG. 1.
Figure 4:
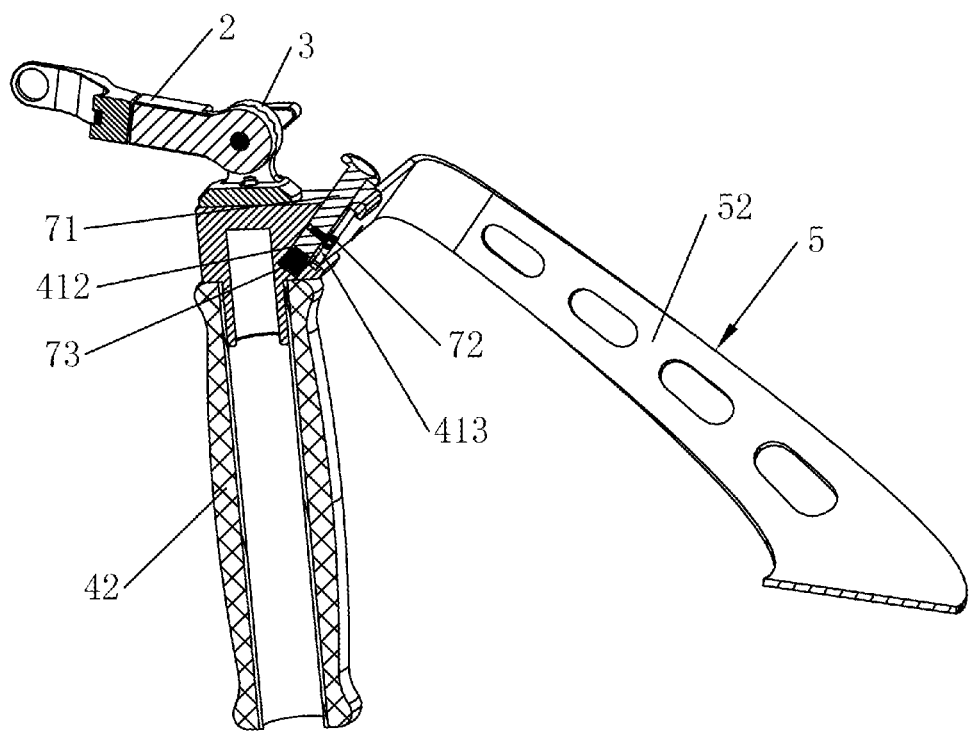
FIG. 4 is a sectional view of a handle of the photography equipment in FIG. 1.

Referring to FIG. 3 and FIG. 4, the handle 4 according to an embodiment will be described in detail below. In this embodiment, the handle grip 42 is removably connected with the arm support 5. The handle grip 42 further includes a base 41. The structure of the arm support 5 has been described in the above and will not be repeated here. A slot 411 is provided on the base 41 for transverse insertion of the horizontal arm section 51 of the arm support 5. The locking structure 7 includes a pin 71, a screw 72, and a spring 73. The pin 71 and the spring 73 are disposed in a mounting groove 412 adjacent to the slot 411. A screw chute 413 is provided at a bottom wall of the slot 411 of the handle base 41, and the slot 411 and the mounting groove 412 are communicated via the screw chute 413, such that the screw 72 may insert in the screw chute 413 from the slot 411, then into the mounting groove 412 and may engage with the pin 71. A locking slot 511 is provided at the front end of the horizontal arm section 51 for the installed screw 72 to slide in or out. The arm support 5 is installed as follows. The horizontal arm section 51 of the arm support 5 is aligned with and inserted into the slot 411 of the handle base 41. Once the horizontal arm section 51 is slid to a position where it contact with the screw 72, a guide wall 512 at the front end of the locking slot 511 acts upon the screw 72 to pull the screw 72 downward. Meanwhile, as the horizontal arm section 51 continues to advance, the screw 72 slides into the locking slot 511 along the guide wall 512, and installation of the arm support 5 is completed. The arm support 5 can be detached by pressing the pin 71 to drive the screw 72 to disengage from the locking slot 511 against the acting force from the spring 73 and thus removing the arm support 5.

Figure 5:
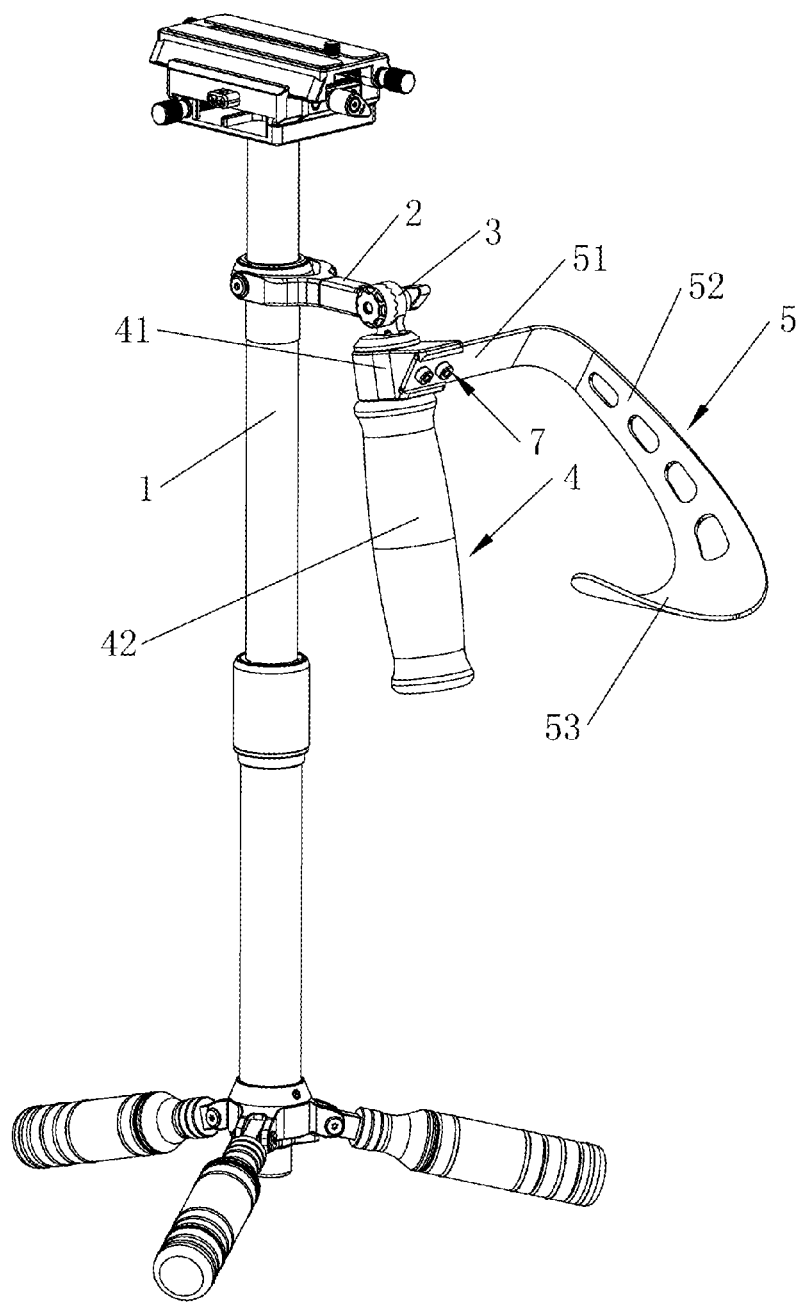
FIG. 5 is a perspective schematic view of a photography equipment assembly according to a further embodiment of the present invention.

Another embodiment is shown in FIG. 5. In this embodiment, the handle grip 42 is removably connected with the arm support 5. The slot 411 is provided on the base 41 for transverse insertion of the horizontal arm section 51 of the arm support 5. The locking structure 7 includes at least one screw, two in this embodiment, which pass through the horizontal arm section 51 from its front side and is screwed to the bottom wall of the slot 411 of the handle base 41. Of course, the locking structure 7 may alternatively be another structure, as long as achieving the assembly and disassembly of the arm support 5.

The above embodiments have illustrated the handles which provide removable connection between the arm support 5 and the handle grip 42. It should be understood that, as an alternative, the arm support 5 can also be non-detachably fixed to the handle grip 42, for example, connected to the handle grip 42 to form a non-detachable single piece with the handle grip 42 by welding.

Although the above embodiments show that the handle 4 with an arm support 5 for the photography equipment is suitable for right-handed users, the left-handed users can also use the apparatus; it is conceivable that the handle 4 with arm support 5 can also be designed as a symmetrical structure of the handle grip 42 of the above embodiment which is more convenient for left-handed users.

In summary, the above are only preferred embodiments of the present invention, and are not intended to limit the scope of the present invention. That is, equivalent changes and modifications made according to the contents of the patent scope of the present invention should belong to the technical scope of the present invention.

What is claimed is:

1. A handle with arm support used for a photography equipment, comprising:
   a handle grip; and
   a connecting portion for connecting with the photography equipment,
   wherein the handle further comprises an arm support connected with the handle grip adapted for supporting a user's arm in use, and the arm support is a structural component which maintains a definite shape under compression and is capable of withstanding a load, the arm support is in the form of a strip which comprises a U shaped or C shaped portion, and wherein the U shaped or C shaped portion forms an accommodation space for accommodating the user's arm, wherein the arm support is detachably connected to the handle grip by a locking structure, the handle grip further comprises a base, a slot is provided on the base for transverse insertion of the arm support, and the locking structure comprises a pin, a screw, and a spring, the pin and the spring are disposed in a mounting groove provided at the base adjacent to the slot, a screw chute is provided at a bottom wall of the slot of the base and the mounting groove and the slot are communicated with each other by the screw chute, such that the screw is capable of inserting in the screw chute from the slot and then into the mounting groove to engage with the pin, a locking slot is provided at a front end of the arm support for the screw sliding in or out.

2. The handle with arm support according to claim 1, wherein a distal end of the arm support far away from the handle grip forms a support section for supporting the user's arm upward in use.

3. The handle with arm support according to claim 2, wherein the arm support at least partially extends obliquely in a direction away from the handle grip.

4. The handle with arm support according to claim 3, wherein the arm support further comprises a horizontal arm section and a vertical arm section, and a front end of the horizontal arm section is connected with the handle grip, the vertical arm section obliquely extends from a bottom end of the horizontal arm section in a direction away from the handle grip, and the support section longitudinally extends from a tail end of the vertical arm section in a direction of substantially lateral to the handle grip.

5. The handle with arm support according to claim 4, wherein the support section is arched.

6. The handle with arm support according to claim 1, wherein the arm support is made of carbon fiber, metal or plastic.

7. The handle with arm support according to claim 1, wherein the arm support is provided with a plurality of holes.

8. The handle with arm support according to claim 1, wherein the arm support is non-detachably and integrally connected to the handle grip.

9. The handle with arm support according to claim 1, wherein the handle grip is provided with a handle sleeve.

10. A photography equipment assembly, comprising:
    a photography equipment; and
    a handle with arm support according to claim 1,
    wherein the handle with arm support is connected to the photography equipment directly or indirectly.

11. The photography equipment assembly according to claim 10, wherein the handle comprises a connecting portion, by means of which the handle is detachably connected to the photography equipment.

12. The photography equipment assembly according to claim 11, wherein the connecting portion is Y shaped.

13. The photography equipment assembly according to claim 11, wherein an upper end of the handle grip is connected with the connecting portion by a joint.

14. The photography equipment assembly according to claim 11, wherein an orientation of the handle is adjustable with respect to the photography equipment.

15. The photography equipment assembly according to claim 10, wherein the photography equipment is a manual stabilizer.

16. The photography equipment assembly according to claim 10, wherein the photography equipment is an electronic stabilizer.

17. A handle with arm support used for a photography equipment, comprising:
    a handle grip; and
    a connecting portion for connecting with the photography equipment,
    wherein the handle further comprises an arm support connected with the handle grip adapted for supporting a user's arm in use, and the arm support is a structural component which maintains a definite shape under compression and is capable of withstanding a load, and a distal end of the arm support far away from the handle grip forms a support section for holding the user's arm in use, the arm support at least partially extends obliquely in a direction away from the handle grip,
    wherein the arm support further comprises a horizontal arm section and a vertical arm section, and a front end of the horizontal arm section is connected with the handle grip, the vertical arm section obliquely extends from a bottom end of the horizontal arm section in a direction away from the handle grip, and the support section longitudinally extends from a tail end of the vertical arm section in a direction of substantially lateral to the handle grip, wherein the arm support is detachably connected to the handle grip by a locking structure, and the handle grip further comprises a base, a slot is provided on the base for transverse insertion of the arm support; the locking structure comprises a pin, a screw, and a spring, the pin and the spring are disposed in a mounting groove provided at the base adjacent to the slot, a screw chute is provided at a bottom wall of the slot of the base and the mounting groove and the slot are communicated with each other by the screw chute, such that the screw is capable of inserting in the screw chute from the slot and then into the mounting groove to engage with the pin, a locking slot is provided at a front end of the horizontal arm section for the screw sliding in or out.

\* \* \* \* \*